United States Patent [19]

Borst

[11] 3,967,117

[45] June 29, 1976

[54] PHOTOGRAPHIC PROCESS

[76] Inventor: Lyle Benjamin Borst, 17 Twin Bridge Lane, Williamsville, N.Y. 14221

[22] Filed: Apr. 18, 1975

[21] Appl. No.: 569,535

[52] U.S. Cl. .................................. 250/323; 250/473; 250/475

[51] Int. Cl.[2] .......................................... G03B 41/16

[58] Field of Search ........... 250/473, 475, 320, 323, 250/490, 491, 492, 302, 303

[56] References Cited

UNITED STATES PATENTS 2,780,732 2/1957 Wheeler ............................. 250/475

OTHER PUBLICATIONS

"Intensification of Faint Nebulosity on Astronomical Plates by Autoradiography," Perry, Bul. of Am. Physical Soc., Apr. 1974, p. 600.

*Primary Examiner*—Craig E. Church
*Attorney, Agent, or Firm*—Stephen L. Borst

[57] ABSTRACT

An improved photographic process in which the images on exposed plates are intensified by replacing the silver grains in the photographic plate with an element having more favorable nuclear properties than the replaced silver, and forming a secondary image by autoradiography, which in some cases is produced after activation of the plates by exposure to a neutron flux.

27 Claims, No Drawings

PHOTOGRAPHIC PROCESS

BACKGROUND OF THE INVENTION

The present invention relates to the intensification of images captured on photographic plates. More specifically, one embodiment of the invention relates to irradiating an emulsion which has had its silver crystals partially or completely replaced by another element which may be activated so that an autoradiograph can be obtained therefrom. In another embodiment, an autoradiograph is produced by replacing the silver crystals with a radionuclide.

There are many examples in which an image may be captured on a photographic emulsion or plate, but in which the image is so faint that it is too indistinct to be of any value. One example lies in the field of Astronomy, where faint astronomical objects are recorded on photographic plates by means of large telescopes and lengthy exposures. Another example lies in the filed of X-radiography wherein a patient is exposed to damaging X-rays for the purpose of capturing an X-ray image on a photographic emulsion. In both of these instances, it would be desirable to reduce the necessary exposure time. In the first instance, if it were possible to photograph faint sources with a reduced exposure time, the efficiency and productivity of the telescope would be substantially increased. In the second instance, a reduced exposure of the patient to the damaging X-rays would be beneficial to the patient. Thus, a method which would intensify the image of a photographic plate is extremely desirable.

Such a method is known in the prior art and is disclosed in the April, 1974 issue of the bulletin of the American Physical Society, page 600. This prior art process proposes taking an exposed photographic emulsion on which an image has been captured in a pattern of silver crystals and irradiating the silver crystals with a neutron flux, thereby activating the silver crystals to radioactive silver isotopes. From this activated plate or emulsion, an autoradiograph is obtained by placing a second photographic emulsion in contact with the first activated photographic emulsion. But this prior art process suffers from the difficulty that the image intensification is limited by the neutron cross-section of the silver nucleus. Thus, is posed the problem of finding a method which would permit greater image intensification so that already recorded, although indistinct images on astronomical plates may be examined, and so that exposure times of both the astronomical telescope or the X-ray machine may be reduced. This object is realized by the present invention through the recognition that the silver atoms of the photographic emulsion may be replaced by the atoms of a "secondary element." By "secondary element" is meant an element which has properties which are more desirable than silver for the purpose of obtaining an enhanced image. Such secondary elements may have larger neutron cross-sections than silver, may decay with the emission of radiations which are more reactive with matter than the beta rays emitted by the radioactive decay of activated silver, may be a fissionable element, or may be a radioisotope.

SUMMARY OF THE INVENTION

It has been discovered that increased contrast of a photographic plate can be obtained through the use of a technique which either replaces the silver grains in the plates with a secondary element or deposits a secondary element at the sites of the silver grains in the photographic plate. This secondary element is either radioactive itself or may be made radioactive by exposure to a neutron flux. Subsequent to the deposition of the secondary element at the sites of the silver grains, the radioactive secondary element emits radiations such as alpha particles or fission fragments which may be used to expose a second photographic emulsion. Accordingly, an image of substantially increased image density or image contrast may be obtained on a second photographic emulsion. The second photographic emulsion is then developed by ordinary means to obtain an autoradiograph.

DESCRIPTION OF THE PREFERRED EMBODIMENT

In a first embodiment for practicing the present invention, a photographic print or negative is treated so that the silver crystals in the print or negative are either replaced with a secondary element or the secondary element is deposited at the positions of the silver crystals. In either case, the step of replacing or depositing the secondary element is for the purpose of producing an image which is composed of a secondary element having nuclear characteristics more desirable than the characteristics of silver. The well-known techniques of toning in the case of a photographic positive and intensification in the case of a photographic negative may be used to deposit the secondary element at the sites of the silver grains, whether the depositing process be one of substitution for the silver atoms or actual deposition on the silver grains. In the first example, the well-known process of toning with a solution containing gold, gold chloride, or gold thiocyanate is used to establish the gold atoms at the sites of the silver grains on a positive. In a second example, the secondary element may be rhodium. Both gold and rhodium are appropriate choices for the process since each of these elements may be activated through neutron bombardment to generate a radioisotope which subsequently decays with appropriate half-lives. The advantage of gold over silver is that gold has a more appropriate half-life than silver thereby rendering the step of obtaining an autoradiograph more satisfactorily accomplished. The advantage of rhodium over silver is that rhodium has a larger neutron capture cross-section. As a result, the photographic emulsion becomes activated to a higher degree with rhodium than with the original silver upon exposure to the same neutron flux. A typical neutron exposure would be at least $10^{12}$ neutrons per square centimeter per second for 10 seconds. Once the secondary element has been activated through neutron exposure, an autoradiograph may be obtained by placing the irradiated and activated photographic emulsion in close adjacent relationship with a second unexposed photographic emulsion. The radiations emitted by the activated secondary element (gold or rhodium) exposes the second photographic emulsion in an image which reproduces the image of the first photographic emulsion. The second photographic emulsion is then developed to render the image captured thereon visible. This image may be of substantially increased contrast or density since the radiations emitted from the secondary element produce a greater effect on the second photographic emulsion than was originally captured on the first photographic emulsion. Thus, even those portions of the image of the first photographic emulsions which were too indistinct to be discernible by visual inspection are increased in contrast or density to the point where they are distinguishable on the exposed and developed second photographic emulsion. In this manner, faint astronomical images can be intensified so that they may be more readily examined. By the same token, since the faint images are more intense, the exposure necessary to produce a distinguishable image by means of a telescope or by means of X-radiography may be reduced.

In a second embodiment the substitute or secondary element may consist of a fissionable element such as uranium-235. A well-known intensifying process is disclosed by C. B. Neblette in his book entitled *Photography* published by D. van Nostrand Company, New York in 1927, of which a second edition was published in 1930. The intensification process for the deposition of uranium on a negative is disclosed in the Neblette book on page 358 and the toning process for the deposition of uranium on a positive is disclosed in the Neblette book on page 446. The first photographic emulsion carrying the uranium image, whether it be a positive or a negative, is then placed against a special fission sensitive plate such as that commercially marketed by The Eastman Kodak Company under the trade name Nuclear Emulsion-C. This pair of photographic emulsions is then exposed to the neutrons of any available neutron source such as generated by a nuclear reactor. During this exposure, the uranium is bombarded by the neutrons and is caused to fission, thereby producing fission fragments and characteristic radiations. Some of these fission fragments and characteristic radiations pass into the second photographic emulsion thereby exposing local portions of the second photographic emulsion. The resulting image on the second photographic emulsion is a reproduction of the uranium image of the first photographic emulsion. In a well-known technique, the second photographic emulsion may be developed by a high contrast developer (Microdol) so that particle tracks in the second emulsion are produced. If these particle tracks are in sufficient number, they will form an image which can be printed in a normal photographic method. Even if a normal image cannot be produced by normal photographic means, the individual particle tracks can be counted locally to form a digitized image. By "digitized image," is meant an image which has been reduced to a series of numbers, each number of which represents the image density at a localized point. Each localized point is uniquely identified by planner coordinates. Once a digitized image has been obtained, it can be converted into an ordinary visual image by means well-known in the art of the U.S. space program. The step of obtaining a digitized image has the advantage that a characteristic digital background can be subtracted from the digitized image to produce an image of increased clarity and resolution. Such a technique has recently been developed and utilized by NASA to clarify the images of pictures returned to the earth from various space probes. This technique is discussed in The Publication of the Astronomical Society of the Pacific, Volume 84, page 161 in an article by L. B. Robinson and E. J. Wampler.

In a third embodiment the secondary element which is established at the silver image of the first photographic emulsion is either a natural or artifically produced radioisotope. This embodiment has the advantage that the secondary element is already radioactive so that the step of irradiation by a flux of neturons is unnecessary to activate the secondary element. In this embodiment, radio lead containing lead-210 which is a radio decay product of radium is appropriate. The principle decay is as follows: lead-210 decays to bismuth-210 by the emission of a beta particle with a characteristic half-life of 25 years. Bismuth-210 then decays the polonium-210 by the characteristic emission of a beta particle with a half-life of 4.85 days. Polonium-210 next decays to lead-206 by the characteristic emission of an alpha particle with a characteristic half-life of 138 days. The alpha particles from polonium-210 would be recorded on a particle sensitive second emulsion, thereby producing an image which can be developed by the usual photographic technique. This embodiment has the further advantage that the alpha particles from the decay of polonium-210 are much more reactive with matter than are the gamma and beta radiations of other radionuclide decays. Thus, the image produced on the second photographic emulsion can be expected to have an increased density or contrast and improved resolution.

What is claimed is:

1. A method for obtaining an image of increased density from a first photographic emulsion having silver grains comprising the steps of:

a. depositing a secondary element at the position of said silver grains in said first photographic emulsion;

b. transferring the image of said first photographic emulsion to a second photographic emulsion by exposure of said second photographic emulsion two radiations emitted by said secondary element; and c. developing said second photographic emulsion to obtain an autoradiograph having an image of increased density.

2. A method of claim 1 wherein the step of transferring the image of said first photograph emulsion to a second photographic emulsion by exposure of said second photographic emulsion to radiations emitted by said secondary element includes the steps of:

a. activating said secondary element by exposing said first photographic emulsion to a flux of neutrons; and b. exposing said second photographic emulsion by placing said first and second photographic emulsions in close adjacent relationship with each other.

3. The method of claim 2 wherein the steps of depositing said secondary element at the position of said silver grains in said first photographic emulsion consists of the step of toning said first photographic emulsion with a toning solution containing said secondary element.

4. The method of claim 2 wherein the steps of depositing said secondary element at the position of said silver grains in said first photographic emulsion consists of the step of intensifying said first photographic emulsion with a solution containing said secondary element.

5. The method of claim 3 wherein said secondary element is gold.

6. The method of claim 3 wherein said secondary element is rhodium.

7. The method of claim 5 wherein said toning solution is a toning solution containing gold chloride.

8. The method of claim 5 wherein said toning solution is a toning solution containing gold thiocyanate.

9. The method for obtaining an image of increased density from the image of a first photographic emulsion having silver grains as recited in claim 2 wherein said secondary element is a fissionable element.

10. The method as recited in claim 9 wherein said fissionable element is uranium.

11. The method as recited in claim 9 wherein said second photographic emulsion is a fission sensitive emulsion.

12. The method as recited in claim 11 wherein said step of developing said second photographic emulsion to obtain an autoradiograph having an intensified image includes the step of developing said photographic emulsion with a high contrast developer.

13. The method as recited in claim 9 wherein said steps of activating said secondary element by exposing said first photographic emulsion to a flux of neutrons and irradiating a second photographic emulsion by placing said first and second photographic emulsions in close adjacent relationship with each other, includes the step of exposing both said first and second photographic emulsions to a neutron flux at the same time in said close adjacent relationship.

14. The method as recited in claim 10 wherein said first photographic emulsion is a positive and said step of depositing said uranium includes the step of toning said positive.

15. The method as recited in claim 10 wherein said first photographic emulsion is a negative and said step of depositing said uranium includes the step of intensifying said negative.

16. The method of claim 2 wherein said step of depositing a secondary element at the positions of said silver grains in said first photographic emulsion includes the step of replacing said silver grains with said secondary element.

17. The method of claim 2 wherein said step of depositing a secondary element at the positions of said silver grains in said first photographic emulsion includes the step of depositing said secondary element on said silver grains.

18. The method of claim 2 wherein said secondary element has a larger nuclear cross-section than said silver.

19. The method for obtaining an image of increased density from a first photographic emulsion having silver grains as recited in claim 2 further including the step of:

a. digitizing the image of said autoradiograph by counting local particle tracks recorded on said second emulsion.

20. The method of claim 19 further including the step of intensifying said digitized image by subtracting a digitized background from said digitized image and subsequently converting said intensified digitized image into a visual image.

21. The method of claim 2 wherein said secondary element decays from an activated state after the bombardment by neutrons with the emission of a radiation which is more reactive with matter than the radiations emitted from the decay of activated silver.

22. The method of claim 1 wherein said secondary element is a radioisotope.

23. The method of claim 22 wherein said step of capturing the image of said first photographic emulsion on a second photographic emulsion by exposure of said second photographic emulsion to radiations emitted by said secondary element includes the step of placing said first and second photographic emulsions in close adjacent relationship with each other.

24. The method of claim 22 wherein said radioisotope is radio lead.

25. The method of claim 22 wherein said radioisotope is a naturally occurring radioisotope.

26. The method of claim 22 wherein said radioisotope is an artifically produced radioisotope.

27. The method of claim 2 wherein said secondary element has a half-life longer than said activated silver.

* * * * *